(12) United States Patent
Lee

(10) Patent No.: US 9,925,963 B2
(45) Date of Patent: Mar. 27, 2018

(54) AUTONOMOUS EMERGENCY BRAKING SYSTEM AND METHOD OF CONTROLLING THE SAME

(71) Applicant: Mando Corporation, Pyeongtaek-si, Gyeonggi-do (KR)

(72) Inventor: Hyung Jik Lee, Seongnam-si (KR)

(73) Assignee: Mando Corporation, Pyeongtaek-si (KR)

( * ) Notice: Subject to any disclaimer, the term of this patent is extended or adjusted under 35 U.S.C. 154(b) by 60 days.

(21) Appl. No.: 15/238,683

(22) Filed: Aug. 16, 2016

(65) Prior Publication Data
US 2017/0050627 A1 Feb. 23, 2017

(30) Foreign Application Priority Data
Aug. 17, 2015 (KR) .................. 10-2015-0115108

(51) Int. Cl.
| | | |
|---|---|---|
| *B60T 8/1755* | (2006.01) | |
| *B60T 7/12* | (2006.01) | |
| *B60T 8/171* | (2006.01) | |
| *B60T 8/58* | (2006.01) | |
| *G01S 13/93* | (2006.01) | |
| *G06K 9/00* | (2006.01) | |
| *G08G 1/16* | (2006.01) | |
| *B60T 7/22* | (2006.01) | |
| *G01S 7/40* | (2006.01) | |

(52) U.S. Cl.
CPC ............ *B60T 8/17558* (2013.01); *B60T 7/22* (2013.01); *B60T 8/171* (2013.01); *B60T 8/58* (2013.01); *G01S 13/931* (2013.01); *G06K 9/00805* (2013.01); *B60T 2201/022* (2013.01); *B60T 2210/32* (2013.01); *B60T 2250/03* (2013.01); *B60T 2250/04* (2013.01); *G01S 2007/4034* (2013.01); *G01S 2013/9346* (2013.01); *G08G 1/166* (2013.01)

(58) Field of Classification Search
CPC .......... B60T 2201/022; B60T 2210/32; B60T 2250/03; B60T 2250/04; B60T 7/22; B60T 8/171; B60T 8/17558; B60T 8/58; G01S 13/931; G01S 2007/4034; G01S 2013/9346; G06K 9/00805; G08G 1/166
See application file for complete search history.

(56) References Cited

U.S. PATENT DOCUMENTS

2017/0108863 A1* 4/2017 Chundrlik, Jr. ... B60W 50/0205

* cited by examiner

*Primary Examiner* — Khoi H Tran
*Assistant Examiner* — Robert T Nguyen
(74) *Attorney, Agent, or Firm* — Hauptman Ham, LLP

(57) ABSTRACT

Disclosed herein are an autonomous emergency braking system and a method of controlling the same, capable of autonomously performing emergency braking using information detected by a radar sensor. The autonomous emergency braking system includes a radar sensor and an ECU. The radar sensor transmits a radio wave and receives a wave reflected from an object in front of a vehicle, so as to detect the object in front of the vehicle. The ECU receives object detection information from the radar sensor, and stops or puts off autonomous emergency braking when the number of times the object is detected within a predetermined distance is equal to or greater than a predetermined number of times, based on the received object detection information.

10 Claims, 7 Drawing Sheets

[Fig. 1]
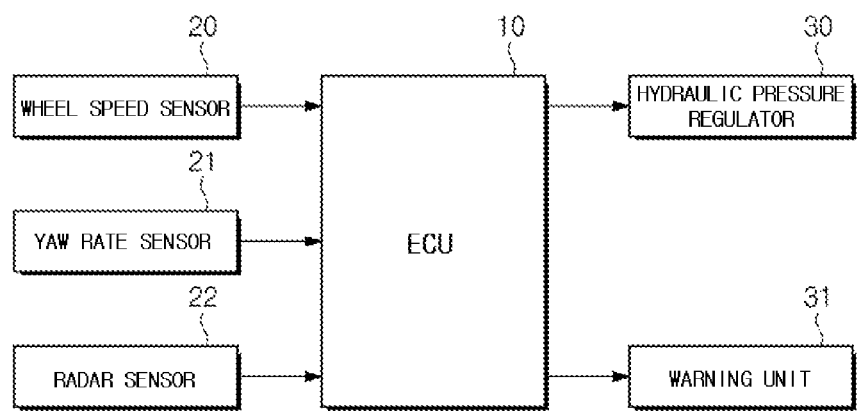

[Fig. 2]
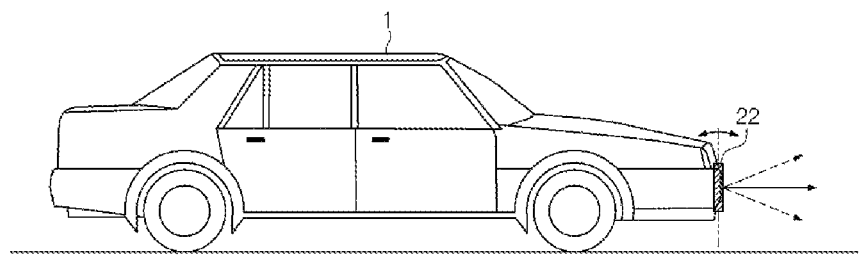

[Fig. 3]
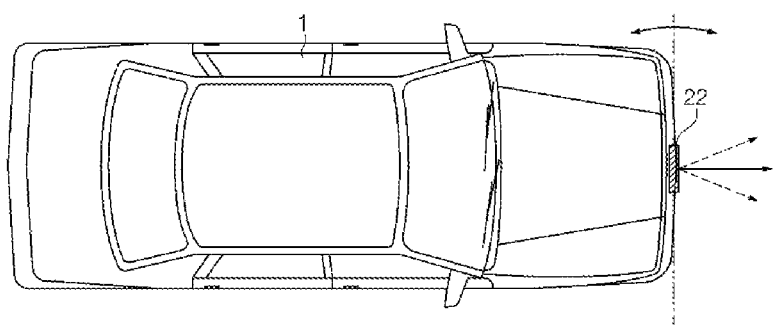

【Fig. 4】
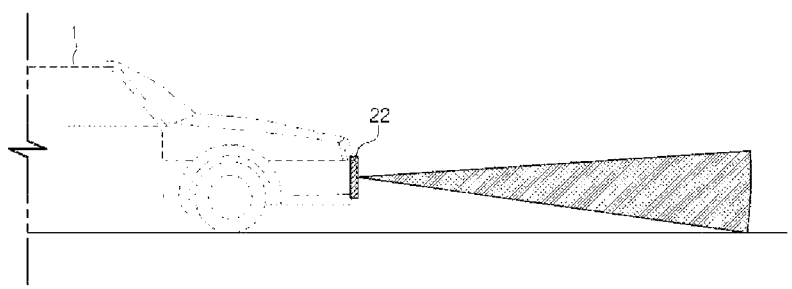

【Fig. 5】
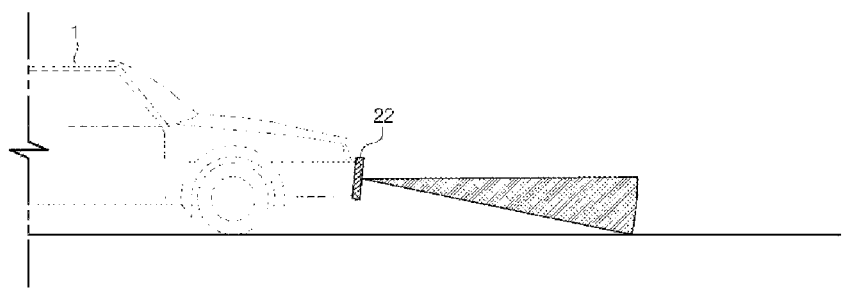

[Fig. 6]
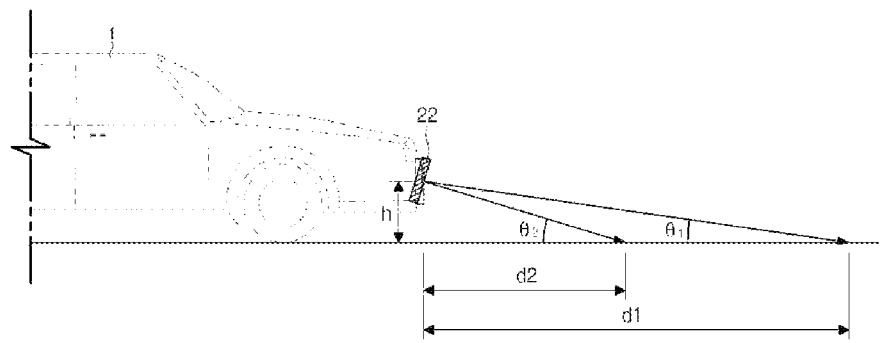

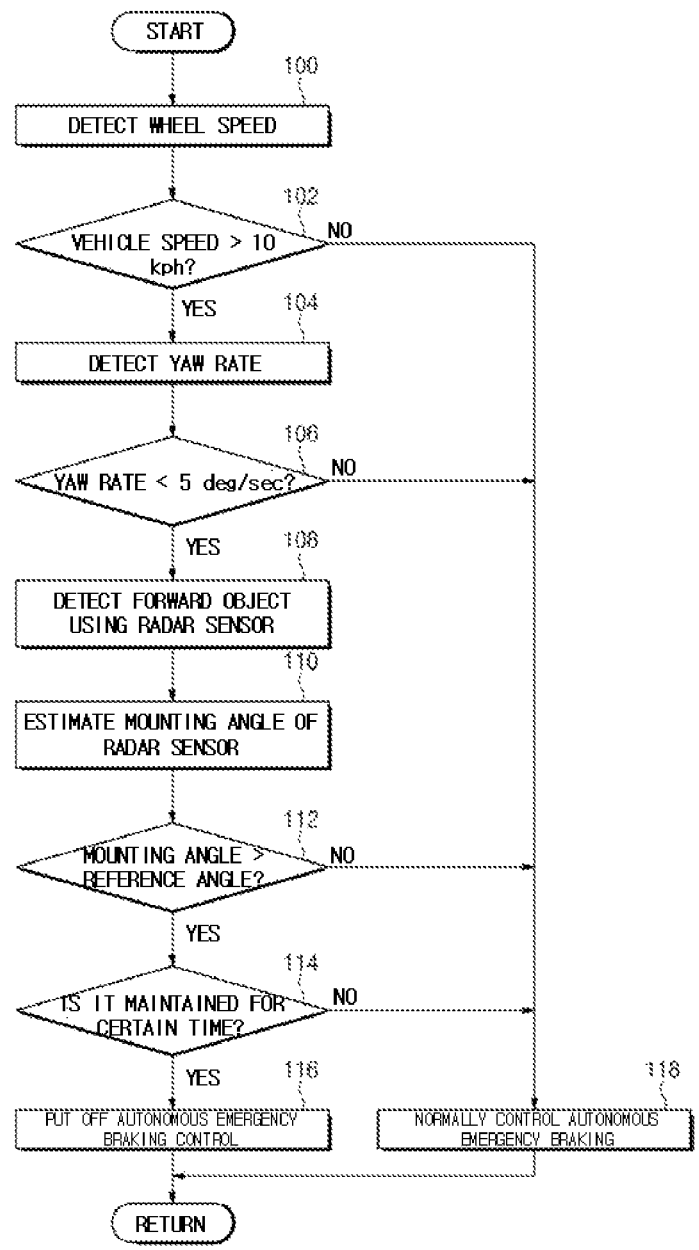

AUTONOMOUS EMERGENCY BRAKING SYSTEM AND METHOD OF CONTROLLING THE SAME

CROSS-REFERENCE(S) TO RELATED APPLICATIONS

This application claims priority to Korean Patent Application No. 10-2015-0115108, filed on Aug. 17, 2015, the disclosure of which is incorporated herein by reference in its entirety.

BACKGROUND OF THE INVENTION

Field of the Invention

Exemplary embodiments of the present invention relate to an autonomous emergency braking system and a method of controlling the same, and more particularly, to an autonomous emergency braking system and a method of controlling the same, capable of autonomously performing emergency braking using information detected by a radar sensor.

Description of the Related Art

In recent years, vehicles equipped with radar sensors have been increased. Vehicle electronic control units may provide a variety of safety or convenience functions using the distance between a vehicle and an object around the vehicle, the relative speed of the vehicle, the angle thereof, etc., based on information output from radar sensors mounted in the vehicle.

An autonomous emergency braking system is a system which prevents a rear-end collision or reduces damage even in the rear-end collision by autonomously operating an emergency brake, as well as warning a driver by sound or lighting, in the event of emergency situations that a preceding vehicle decelerates or stops or obstacles such as a pedestrian suddenly appear, by checking the distance between a vehicle and an object around the vehicle, the angle of the vehicle, or the relative speed thereof, based on information input from a radar sensor mounted in the vehicle.

In order to perform an autonomous emergency braking function in this autonomous emergency braking system, the reliability of information input from the radar sensor mounted in the vehicle is important. However, since the radar sensor is mounted in the vehicle, the radar sensor is shocked by the traveling of the vehicle or various causes. For this reason, the radar sensor is deviated from an initial mounted position, and the mounting angle of the radar sensor may be out of the normal range.

When the mounting position of the radar sensor is out of the normal range, the mounting angle of the radar sensor may be erroneous. Hence, the information output from the radar sensor has low reliability, in which case the autonomous emergency braking may malfunction.

SUMMARY OF THE INVENTION

An object of the present invention is to provide an autonomous emergency braking system and a method of controlling the same, capable of determining whether or not a radar sensor is erroneously mounted, and preventing unnecessary autonomous emergency braking when the radar sensor is erroneously mounted.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, an autonomous emergency braking system for performing an autonomous emergency braking function that autonomously brakes a vehicle depending on a distance and a speed relative to an object in front of the vehicle includes an ECU. The ECU receives object detection information from a radar sensor for detecting the object by transmitting a radio wave and receiving a wave reflected from the object in front of the vehicle. The ECU prohibits autonomous emergency braking when the number of times the object is detected within a predetermined distance is equal to or greater than a predetermined number of times, based on the received object detection information.

The ECU may detect a mounting position of the radar sensor, and stop or put off the autonomous emergency braking when the mounting position of the radar sensor is out of a normal range.

The ECU may estimate a mounting angle of the radar sensor, based on a height of the radar sensor from the ground and a radar detection distance, which is a distance between the radar sensor and the object on the basis of the ground. The ECU may compare the estimated mounting angle of the radar sensor with a reference angle so as to determine whether or not the mounting position of the radar sensor is erroneous. When the mounting position of the radar sensor is determined to be erroneous, the ECU may prohibit the autonomous emergency braking.

The autonomous emergency braking system may further include a yaw rate sensor configured to detect a yaw rate of the vehicle, and a wheel speed sensor configured to detect a speed of each wheel. The ECU may prohibit the autonomous emergency braking when a vehicle speed determined from the wheel speed detected by the wheel speed sensor is higher than a predetermined vehicle speed value and the yaw rate detected by the yaw rate sensor is lower than a predetermined yaw rate value.

The autonomous emergency braking system may further include a camera module disposed in the vehicle to detect a forward object and generate detection data of the forward object. The ECU may allow the autonomous emergency braking to be normally controlled, based on the detection data of the forward object, when autonomous emergency braking control is stopped or put off.

In accordance with another aspect of the present invention, a method of controlling an autonomous emergency braking system performs an autonomous emergency braking function that autonomously brakes a vehicle depending on a distance and a speed relative to an object in front of the vehicle. The method includes receiving object detection information from a radar sensor for detecting the object by transmitting a radar signal and receiving a wave reflected from the object. The method includes determining whether or not the number of times the object is detected within a predetermined distance is equal to or greater than a predetermined number of times, based on the received object detection information. The method includes prohibiting autonomous emergency braking when the number of times the object is detected within the predetermined distance is determined to be equal to or greater than the predetermined number of times.

A mounting position of the radar sensor may be detected, and the autonomous emergency braking may be stopped or put off when the mounting position of the radar sensor is out of a normal range.

In the prohibiting autonomous emergency braking, when the number of times the object is detected within the predetermined distance is determined to be equal to or greater than the predetermined number of times, a mounting angle of the radar sensor may be estimated based on a radar detection distance. The radar detection distance is a value that is calculated from a height of the radar sensor from the ground and a distance between the radar sensor and the object on the basis of the ground. The estimated mounting angle of the radar sensor may be compared with a reference angle, so as to determine whether or not the mounting position of the radar sensor is erroneous. When the mounting position of the radar sensor is determined to be erroneous, the autonomous emergency braking may be prohibited.

The method may further include detecting a yaw rate of the vehicle, and detecting a speed of each wheel. The autonomous emergency braking may be stopped or put off when a vehicle speed determined from the detected wheel speed is higher than a predetermined vehicle speed value and the detected yaw rate is lower than a predetermined yaw rate value.

The method may further include detecting a forward object to generate detection data of the forward object using a camera module disposed in the vehicle. The autonomous emergency braking may be returned to be normally controlled, based on the detection data of the forward object, when autonomous emergency braking control is stopped or put off.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a control block diagram illustrating an autonomous emergency braking system according to an embodiment of the present invention;

FIGS. 2 and 3 are views for explaining a radar sensor of the autonomous emergency braking system according to the embodiment of the present invention;

FIGS. 4 and 5 are views for explaining a change in the angle of a radar beam between when the radar sensor is normally mounted and when the radar sensor is erroneously mounted in the autonomous emergency braking system according to the embodiment of the present invention;

FIG. 6 is a view for explaining a change in the mounting angle of the radar sensor between when the radar sensor is normally mounted and when the radar sensor is erroneously mounted in the autonomous emergency braking system according to the embodiment of the present invention; and FIG. 7 is a flowchart illustrating a method of controlling an autonomous emergency braking system according to another embodiment of the present invention.

DESCRIPTION OF SPECIFIC EMBODIMENTS

Exemplary embodiments of the present invention will be described below in more detail with reference to the accompanying drawings so as to be realized by a person of ordinary skill in the art. The present invention may, however, be embodied in different forms and should not be construed as limited to the embodiments set forth herein.

In certain embodiments, description irrelevant to the present invention may be omitted to avoid obscuring appreciation of the disclosure. Throughout the disclosure, like reference numerals refer to like parts throughout the various figures and embodiments of the present invention.

In the whole description, it will be understood that when an element is referred to as being "connected" to another element, it can be "directly connected" to the other element or it can be "electrically connected" to the other element with other elements being interposed therebetween. In addition, it will be understood that when a component is referred to as being "comprising" any component, it does not exclude other components, but can further comprises the other components unless otherwise specified.

It will be understood that when an element is referred to as being "above" another element, it can be immediately above the other element or intervening elements may also be present. In contrast, when an element is referred to as being "immediately above" another element, there are no intervening elements present.

Although terms such as first, second, and third are used to describe various parts, components, regions, layers, and/or sections, the present invention is not limited thereto. Such terms will be used only to differentiate one part, component, region, layer, or section from other parts, components, regions, layers, or sections. Accordingly, a first part, component, region, layer, or section may be referred to as a second part, component, region, layer, or section without deviating from the scope and spirit of the present invention.

The terminology used in the specification of the present invention is for the purpose of describing particular embodiments only and is not intended to limit the invention. As used in the specification and the appended claims, the singular forms are intended to include the plural forms as well, unless context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, and/or components thereof.

Spatially-relative terms such as "below", "above", or the like may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" other elements would then be oriented "above" the other elements. The exemplary terms "below" can, therefore, encompass both an orientation of above and below. Since the device may be oriented in another direction such as rotation of 90° or another angle, the spatially-relative terms may be interpreted in accordance with the orientation of the device.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the present invention will be described in more detail with reference to the accompanying drawings so as to be realized by a person of ordinary skill in the art. The present invention may, however, be embodied in different forms and should not be construed as limited to the embodiments set forth herein.

FIG. 1 is a control block diagram illustrating an autonomous emergency braking system according to an embodiment of the present invention.

Referring to FIG. 1, the autonomous emergency braking system includes an ECU (Electronic Control Unit) 10 which performs the overall control thereof.

A wheel speed sensor 20, a yaw rate sensor 210, and a radar sensor 22 are electrically connected to the input side of the ECU 10. In addition, a camera module disposed in a vehicle generates detection data of a forward object, and provides the detection data of the forward object to the ECU 10.

A hydraulic pressure regulator 30 and a warning unit 31 are electrically connected to the output side of the ECU 10.

The wheel speed sensor 20 is provided in each of wheels to detect the speed of the wheel.

The wheel speed sensor 20 outputs pulse signals corresponding to a change in magnetic field between a pole piece and a rotor rotating along with the wheel. The ECU 10 may calculate the speed of a vehicle depending on the number of pulses using each of the pulse signals provided from the wheel speed sensor 20.

The yaw rate sensor 21 detects the yaw rate (turning speed) of the vehicle and transfers it to the ECU 10. The yaw rate sensor 21 electronically detects the yaw moment of the vehicle while the plate fork in the vehicle causes a vibration change when the vehicle rotates about a vertical axis (in a Z-axis direction). Here, the yaw moment is a force that is intended to move toward inside and outside wheels when the front and rear of a vehicle body turn to the left or right. For example, the yaw rate sensor 21 has a cerium crystal element therein, and may have a structure in which the cerium crystal element generates a voltage while rotating when the vehicle moves and rotates.

The radar sensor 22 is a radio monitoring device which emits a micro-electromagnetic wave (microwave having a wavelength from 10 [cm] to 100 [cm]) to an object and receives the electromagnetic wave reflected from the object, so as to detect the distance from the object, the direction thereof, the height thereof, etc. The radar sensor 22 detects a forward object such as a preceding vehicle in front of a vehicle.

FIGS. 2 and 3 are views for explaining the radar sensor of the autonomous emergency braking system according to the embodiment of the present invention.

Referring to FIGS. 2 and 3, the radar sensor 22 of the autonomous emergency braking system is mounted in the bumper rail of a vehicle 1.

The radar sensor 22 transmits radar signals to the front of the vehicle 1 as indicated by arrows and receives the signals reflected from an object in front of the vehicle 1, so as to detect the distance and speed relative to the object. Here, the detected distance and speed are provided to the ECU 10.

The radar sensor 22 outputs track information, which corresponds to a distance of a vehicle relative to a forward object, a speed of the vehicle relative to the forward object, and an angle of the vehicle relative to the forward object, to the ECU 10. The radar sensor 22 may output track information about one or more forward objects to the ECU 10. In addition, the radar sensor 22 may continue to trace a forward object even when the position or speed of a vehicle varies depending on the traveling thereof, and output track information about the same object to the ECU 10. The ECU 10 receives the track information from the radar sensor 22. The ECU 10 analyzes the received track information to recognize information of the forward object, and performs an autonomous emergency braking function suing the recognized information of the forward object.

As described above, the autonomous emergency braking system detects a distance between a vehicle and an object around the vehicle, an angle thereof, or a relative speed thereof, using the information input from the radar sensor 22 mounted in the vehicle. Through such structure, the autonomous emergency braking system performs the autonomous emergency braking of a vehicle when a preceding vehicle decelerates or stops or obstacles such as a pedestrian suddenly appear. Accordingly, in order to perform the autonomous emergency braking function, the reliability of information input from the radar sensor 22 is important. Since the radar sensor 22 is mounted in the vehicle, the radar sensor is shocked by the traveling of the vehicle or various causes. For this reason, the radar sensor is deviated from an initial mounted position, and the mounting angle of the radar sensor may be out of the normal range.

When the mounting position of the radar sensor 22 is out of the normal range, the mounting angle of the radar sensor 22 may be erroneous. Hence, the information output from the radar sensor 22 has low reliability, in which case unnecessary autonomous emergency braking may be performed. That is, after the vehicle is released, the position of the installed radar sensor 22 may be changed due to collision or part deterioration. The irradiation angle of the signal emitted from the radar sensor 22 is changed with respect to a vertical plane and/or a horizontal plane due to the change of the position of the radar sensor 22, and hence desired performance may not be obtained from the autonomous emergency braking system using the radar sensor 22.

FIGS. 4 and 5 are views for explaining a change in the angle of a radar beam between when the radar sensor is normally mounted and when the radar sensor is erroneously mounted in the autonomous emergency braking system according to the embodiment of the present invention.

As illustrated in FIG. 4, when the radar sensor 22 is normally and vertically mounted in the vehicle 1, the radar beam emitted from the radar sensor 22 may reach relatively far away.

However, as illustrated in FIG. 5, when the radar sensor 22 is not normally and vertically mounted but it is inclined to the ground, the radar beam emitted from the radar sensor 22 does not reach far away but it reaches the ground which is relatively close.

Hence, the radar sensor 22 mistakes the ground for a forward object due to the wave reflected from the ground even though the forward object is not present, and outputs track information. For this reason, the ECU 10 may perform unnecessary autonomous emergency braking due to the erroneous track information on the forward object. The autonomous emergency braking system according to the present invention detects whether or not the radar sensor 22 is erroneously mounted, and thus prevents unnecessary autonomous emergency braking from being performed when the radar sensor 22 is erroneously mounted.

FIG. 6 is a view for explaining a change in the mounting angle of the radar sensor between when the radar sensor is normally mounted and when the radar sensor is erroneously mounted in the autonomous emergency braking system according to the embodiment of the present invention.

When the radar sensor 22 is installed at a height of h from the ground, and d is a radar detection distance, which is a distance between the radar sensor 22 and a forward object on the basis of the ground in the state in which the vehicle stably travels, the mounting angle θ of the radar sensor 22 may be indicated by the following Equation 1.

$$\tan\theta = \frac{h}{d}$$ [Equation 1]
$$\theta = \tan^{-1}\left(\frac{h}{d}\right)$$

Referring to FIG. 6, when the radar sensor 22 is mounted at a normal position, it is assumed that the height of the radar sensor 22 is h and the radar detection distance is d1. When the radar sensor 22 is erroneously mounted, it is assumed that the height of the radar sensor 22 is h and the radar detection distance is d2. Here, d1 is a relatively longer than d2.

When the radar sensor 22 is normally mounted, the mounting angle θ1 thereof may be indicated by the following Equation 2.

$$\tan\theta_1 = \frac{h}{d_1}$$ [Equation 2]
$$\theta_1 = \tan^{-1}\left(\frac{h}{d_1}\right)$$

When the radar sensor 22 is erroneously mounted, the mounting angle θ2 thereof may be indicated by the following Equation 3.

$$\tan\theta_2 = \frac{h}{d_2}$$ [Equation 3]
$$\theta_2 = \tan^{-1}\left(\frac{h}{d_2}\right)$$

In this case, since d1 is a relatively longer than d2, it can be seen that the mounting angle θ2 of the radar sensor 22 is a greater value than θ1.

As such, it can be seen that the mounting angle value of the radar sensor 22 when the radar sensor 22 is erroneously mounted is greater than that when the radar sensor 22 is normally mounted.

Accordingly, it may be determined whether or not the radar sensor 22 is erroneously mounted by detecting a change in the mounting angle of the radar sensor 22.

Referring to FIG. 1 again, the hydraulic pressure regulator 30 regulates the braking pressure of each wheel cylinder in order to generate the hydraulic braking force of each wheel. The hydraulic pressure regulator 30 constitutes a hydraulic modulator block which regulates the hydraulic braking force of each wheel by regulating the braking pressure of each wheel cylinder in an ABS (Anti-lock Brake System) or an ESC (Electronic Stability Control) system which is an electronic brake system.

The warning unit 31 warns a driver of the erroneous mounting of the radar sensor 22. The warning unit 31 is realized by a visual component such as a warning lamp or an audible component such as a buzzer, which is installed in a proper place within the vehicle. The warning unit 31 warns of the erroneous mounting of the radar sensor 22 by operating the warning lamp or the buzzer in response to the control signal of the ECU 10. The warning unit 31 may use a speaker as audible component. The speaker may be a speaker of an audio system included in the vehicle or a separate speaker provided in a proper place within the vehicle.

As another example, the ECU 10 determines whether or not the radar sensor 22 is erroneously mounted. In this case, the ECU 10 determines whether or not the vehicle stably travels using a vehicle speed, which is calculated from the speed of each wheel detected by the wheel speed sensor 20, and a yaw rate detected by the yaw rate sensor 20. In this case, when the calculated vehicle speed is higher than a predetermined speed value and the detected yaw rate is lower than a predetermined yaw rate value, the ECU 10 determines that the vehicle stably travels.

In addition, when the vehicle stably travels, the ECU 10 calculates the mounting angle of the radar sensor 22. When the calculated mounting angle is greater than a predetermined reference angle, the ECU 10 determines that the radar sensor 22 is erroneously mounted.

Meanwhile, when the radar sensor 22 is erroneously mounted, the ECU 10 warns a driver of the erroneous mounting of the radar sensor 22 through the warning unit 31. At the same time, the ECU 10 prohibits or puts off the execution of the autonomous emergency braking function so as not to perform the autonomous emergency braking function due to the track information provided from the radar sensor 22 which is erroneously mounted.

In addition, when the radar sensor 22 is normally mounted, the ECU 10 analyzes the track information of the forward object provided from the radar sensor 22. When an object approaches the front of the traveling vehicle, the ECU 10 controls the hydraulic pressure regulator 30, based on the speed and distance relative to the object, so as to perform the autonomous emergency braking function.

FIG. 7 is a flowchart illustrating a method of controlling an autonomous emergency braking system according to another embodiment of the present invention.

Referring to FIG. 7, an ECU 10 first detects the speed of each wheel using a wheel speed sensor 20 (S100).

After the speed of each wheel is detected, the ECU 10 calculates a vehicle speed based on the detected speed of each wheel, and determines whether or not the calculated vehicle speed exceeds a predetermined value of 10 kph (S102).

When the vehicle is determined to exceed 10 kph in step S102, the ECU 10 detects the yaw rate of the vehicle using a yaw rate sensor 21 (S104).

Meanwhile, after the yaw rate of the vehicle is detected, the ECU 10 compares the detected yaw rate with a predetermined yaw rate value of 5 deg/sec (S106). As a result of comparison, when the detected yaw rate is lower than 5 deg/sec, the vehicle is determined to stably travel.

When the yaw rate is determined to be lower than 5 deg/sec in step S106, the ECU 10 detects a forward object using a radar sensor 22 (S108).

After the forward object is detected by the radar sensor 22, the ECU 10 analyzes the track information of the forward object detected by the radar sensor 22, and estimates the mounting angle of the radar sensor 22 (S110). As described above, the mounting angle θ of the radar sensor 22 is estimated based on the height of the radar sensor 22 and a radar detection distance using the above Equation 1. In this case, when the forward object is close to the vehicle and the number of times the track information of the forward object is generated is equal to or greater than a predetermined number of times, the ECU 10 may estimate the mounting angle of the radar sensor 22.

The ECU 10 compares the estimated mounting angle with a reference angle and determines whether or not the estimated mounting angle exceeds the reference angle (S112). As illustrated in FIG. 6, the mounting angle value of the radar sensor 22 when the radar sensor 22 is erroneously mounted is greater than that when the radar sensor 22 is normally mounted. Accordingly, when the estimated mounting angle exceeds the reference angle, it may be determined that the radar sensor 22 is mounted erroneously toward the ground.

When the estimated mounting angle is determined to exceed the reference angle in step S112, the ECU 10 counts a time at which the estimated mounting angle exceeds the reference angle, and determines whether or not the time is maintained for a certain time (S114).

When the time at which the estimated mounting angle exceeds the reference angle is determined to be maintained for the certain time in step S114, the ECU 10 stops or puts off autonomous emergency braking control so as not to perform unnecessary autonomous emergency braking control (S116).

Meanwhile, when the vehicle speed is determined to be equal to or less than 10 kph and the requirement for autonomous emergency braking is satisfied in step S102, the autonomous emergency braking control is performed for autonomous emergency braking.

In addition, when the detected yaw rate is determined to be equal to or greater than 5 deg/sec and the requirement for autonomous emergency braking is satisfied in step S106, the autonomous emergency braking control is performed for autonomous emergency braking.

In addition, when the estimated mounting angle of the radar sensor 22 is determined to be equal to or smaller than the reference angle and the requirement for autonomous emergency braking is satisfied in step S112, the autonomous emergency braking control is performed for autonomous emergency braking.

In addition, when the time at which the estimated mounting angle exceeds the reference angle is determined to be not maintained for the certain time and the requirement for autonomous emergency braking is satisfied in step S114, the autonomous emergency braking control is performed for autonomous emergency braking.

When the autonomous emergency braking control is stopped or put off in step S116, the ECU 10 may allow the autonomous emergency braking to be returned to be normally controlled, based on the detection data of the forward object input from a camera disposed in the vehicle. Here, it is possible to generate the detection data of the forward object, regardless of daytime and nighttime, using the daytime/nighttime mode of the camera module, and to allow the autonomous emergency braking to be returned to be normally controlled, based on the detection data of the forward object.

As is apparent from the above description, in accordance with exemplary embodiments of the present invention, the mounting angle of a radar sensor is estimated based on the height of the radar sensor from the ground and the radar detection distance which is a distance between the radar sensor and an object on the basis of the ground. It can be determined whether or not the radar sensor is erroneously mounted by comparing the estimated mounting angle of the radar sensor with a reference angle and determining whether or not the mounting position of the radar sensor is erroneous.

Through such structure, it is possible to prevent unnecessary autonomous emergency braking when the radar sensor is erroneously mounted.

The present invention is not limited to the foregoing effects, and other effects thereof will be clearly understood by those skilled in the art from the following claims.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

In one or more exemplary embodiments, the functions of the present application may be implemented by hardware, software, firmware, or any combination thereof. When implemented in software, these functions may be stored or transmitted as one or more instructions or codes on computer-readable media. The computer-readable media may include both computer storage media and communication media including any medium that facilitates transfer of a computer program from one place to another place. The storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, when software is transmitted from websites, servers, or other remote sources using coaxial cables, fiber optic cables, twisted pairs, digital subscriber line (DSL), or wireless technologies, such as infrared, radio, and microwaves, the coaxial cables, fiber optic cables, twisted pairs, DSL, or wireless technologies, such as infrared, radio, and microwaves, are included in the definition of media. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of them should also be included within the scope of computer-readable media.

Furthermore, when embodiments are implemented with program code or code segments, a code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. Additionally, in some aspects, steps of the methods or algorithms and/or operations may reside as one of codes and/or commands on a machine-readable medium and/or a computer-readable medium, or a certain combination or set thereof.

For a software implementation, the techniques described herein may be implemented with modules (e.g., procedures, functions, and so on) that perform the functions described herein. Software codes may be stored in memory units and executed by processors. The memory units may be implemented within the processors or external to the processors. In this case, the memory units can be connected to the processors by various means so as to communicate therewith.

For a hardware implementation, processing units may be implemented with one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

While specific embodiments of the subject invention have been discussed, the above specification is illustrative and not restrictive. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," and the like are used in the detailed description, claims, appendices and drawings such terms are intended to be inclusive in a manner similar to the term "comprising" as "comprising" is interpreted when employed as a transitional word in a claim.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (such as data from one component interacting with another component in a local system, distributed system, and/or across a network such as the Internet with other systems by way of the signal).

What is claimed is:

1. A method of controlling an autonomous emergency braking system for performing an autonomous emergency braking function that autonomously brakes a vehicle depending on a distance and a speed relative to an object in front of the vehicle, the method comprising:
receiving object detection information from a radar sensor for detecting the object by transmitting a radar signal and receiving a wave reflected from the object;
determining whether or not the number of times the object is detected within a predetermined distance is equal to or greater than a predetermined number of times, based on the received object detection information; and
stopping or putting off autonomous emergency braking when the number of times the object is detected within the predetermined distance is determined to be equal to or greater than the predetermined number of times.

2. The method according to claim 1, wherein a mounting position of the radar sensor is detected, and the autonomous emergency braking is stopped or put off when the mounting position of the radar sensor is out of a normal range.

3. The method according to claim 2, wherein:
when the number of times the object is detected within the predetermined distance is determined to be equal to or greater than the predetermined number of times, a mounting angle of the radar sensor is estimated based on a height of the radar sensor from the ground and a radar detection distance, which is a distance between the radar sensor and the object on the basis of the ground; and
the estimated mounting angle of the radar sensor is compared with a reference angle, so as to determine whether or not the mounting position of the radar sensor is erroneous.

4. The method according to claim 1, further comprising:
detecting a yaw rate of the vehicle; and
detecting a speed of each wheel,
wherein the autonomous emergency braking is stopped or put off when a vehicle speed determined from the detected wheel speed is higher than a predetermined vehicle speed value and the detected yaw rate is lower than a predetermined yaw rate value.

5. The method according to claim 1, further comprising detecting a forward object to generate detection data of the forward object using a camera module disposed in the vehicle,
wherein the autonomous emergency braking is returned to be normally controlled, based on the detection data of the forward object, when autonomous emergency braking control is stopped or put off.

6. An autonomous emergency braking system for performing an autonomous emergency braking function that autonomously brakes a vehicle depending on a distance and a speed relative to an object in front of the vehicle, the autonomous emergency braking system comprising:
a radar sensor configured to detect the object in front of the vehicle by transmitting a radio wave and receiving a wave reflected from the object in front of the vehicle; and
an ECU configured to receive object detection information from the radar sensor, and to stop or put off autonomous emergency braking when the number of times the object is detected within a predetermined distance is equal to or greater than a predetermined number of times, based on the received object detection information.

7. The autonomous emergency braking system according to claim 6, wherein the ECU detects a mounting position of the radar sensor, and stops or puts off the autonomous emergency braking when the mounting position of the radar sensor is out of a normal range.

8. The autonomous emergency braking system according to claim 7, wherein the ECU estimates a mounting angle of the radar sensor, based on a height of the radar sensor from the ground and a radar detection distance, which is a distance between the radar sensor and the object on the basis of the ground, and compares the estimated mounting angle of the radar sensor with a reference angle so as to determine whether or not the mounting position of the radar sensor is erroneous.

9. The autonomous emergency braking system according to claim 6, further comprising:
   a yaw rate sensor configured to detect a yaw rate of the vehicle; and
   a wheel speed sensor configured to detect a speed of each wheel,
   wherein the ECU stops or puts off the autonomous emergency braking when a vehicle speed determined from the wheel speed detected by the wheel speed sensor is higher than a predetermined vehicle speed value and the yaw rate detected by the yaw rate sensor is lower than a predetermined yaw rate value.

10. The autonomous emergency braking system according to claim 6, further comprising a camera module disposed in the vehicle to detect a forward object and generate detection data of the forward object,
   wherein the ECU allows the autonomous emergency braking to be normally controlled, based on the detection data of the forward object, when autonomous emergency braking control is stopped or put off.

* * * * *